United States Patent
Sun et al.

(10) Patent No.: US 8,085,756 B2
(45) Date of Patent: Dec. 27, 2011

(54) AUTOMATICALLY SENDING RICH CONTACT INFORMATION COINCIDENT TO A TELEPHONE CALL

(75) Inventors: Ray Sun, Issaquah, WA (US); Zeke Koch, Seattle, WA (US); Erick J. Eidus, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1242 days.

(21) Appl. No.: 11/144,276

(22) Filed: Jun. 3, 2005

(65) Prior Publication Data

US 2007/0010264 A1    Jan. 11, 2007

(51) Int. Cl.
*H04L 12/66*    (2006.01)
*H04M 1/56*    (2006.01)
*H04W 4/00*    (2009.01)

(52) U.S. Cl. .................... 370/352; 379/142.01; 455/466

(58) Field of Classification Search ............ 379/142.01, 379/93.03, 93.23; 455/466, 415, 412.1
See application file for complete search history.

(56) References Cited

U.S. PATENT DOCUMENTS

| | | | |
|---|---|---|---|
| 7,155,211 B2 * | 12/2006 | Mun et al. ................... 455/415 |
| 7,280,646 B2 * | 10/2007 | Urban et al. ............ 379/142.01 |
| 7,613,472 B2 * | 11/2009 | Northcutt ..................... 455/466 |
| 2002/0098849 A1 * | 7/2002 | Bloebaum et al. ............ 455/456 |
| 2002/0128047 A1 * | 9/2002 | Gates ........................... 455/566 |
| 2003/0018966 A1 * | 1/2003 | Cook et al. ....................... 725/2 |
| 2003/0078981 A1 * | 4/2003 | Harms et al. .................. 709/206 |
| 2004/0044536 A1 * | 3/2004 | Fitzpatrick et al. ............... 705/1 |
| 2005/0091272 A1 * | 4/2005 | Smith et al. ................ 707/104.1 |
| 2005/0149487 A1 * | 7/2005 | Celik ................................ 707/1 |
| 2006/0195506 A1 * | 8/2006 | Deng ............................. 709/203 |
| 2007/0174474 A1 * | 7/2007 | Zhong et al. .................. 709/230 |
| 2007/0276911 A1 * | 11/2007 | Bhumkar et al. ............. 709/206 |
| 2009/0086939 A1 * | 4/2009 | Chatterjee .................. 379/93.03 |

* cited by examiner

*Primary Examiner* — William Deane, Jr.
(74) *Attorney, Agent, or Firm* — Merchant & Gould (57) ABSTRACT

Rich contact information is provided coincident to a telephone call on a mobile device in an alternate communication. When a telephone call is received on the phone, rich content such as rich personal contact data is provided to the receiver of the call. The rich contact data corresponds to the sender of the call. The rich contact data is sent as an alternate communication directly between the device initiating the call and the device receiving the call.

20 Claims, 6 Drawing Sheets

Mobile Device

AUTOMATICALLY SENDING RICH CONTACT INFORMATION COINCIDENT TO A TELEPHONE CALL

BACKGROUND

Mobile devices including portable telephone systems, such as cellular phones, have been steadily increasing the type and variety of content that they provide to a user. Many mobile devices incorporate sufficient computing capabilities to fall within the category of the small, handheld computing devices. Mobile devices may be known by other names rather than cellular phones and generally refer to devices that have been integrated with receiver/transmitter technology so that they can send and receive telephone calls or other messages via a network. These newly integrated mobile devices include palmtops, pocket computers, personal digital assistants, personal organizers, H/PCs, and the like. In addition to the sending and receipt of phone calls, these mobile devices provide many functions to users including word processing, task management, spreadsheet processing, address book functions, Internet browsing, and calendaring, as well as many other functions.

With the addition of these functions to the basic phone call functions, the mobile devices are now sending and receiving a host of information across a variety of networks. The mobile devices now take advantage of Internet access, Short Messaging Services (SMS), RF broadcasts, and other methods to provide content to a user of a mobile device. The level of content and interaction provided by a mobile device steadily increases as these variety of transmission types and interoperability on the mobile devices increases. Despite all these advantages, the functional aspects for the transmission and receipt of phone calls on the mobile device have remained fairly static.

SUMMARY

According to aspects of various described embodiments, rich contact information is provided coincident to a telephone call on a mobile device in an alternate communication. When a telephone call is received on the phone, rich personal contact data is provided to the receiver of the call. The rich contact data corresponds to the sender of the call. Currently, the phone network provides caller ID information to a mobile device receiving telephone call. Aspects of the present invention provide for sending rich contact data as an alternate communication directly (i.e., in a device-to-device connection) between the device initiating the call and the device receiving the call.

In accordance with one aspect of a described embodiment, rich content is automatically transmitted between mobile devices coincident to a telephone call. An alternate communication connection is established between a first mobile device and a second mobile device. The alternate communication connection is a direct connection between devices. The connection is resolved from a telephone number provided in the telephone call. The rich content is transmitted between devices across this alternate communication connection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF ILLUSTRATED EMBODIMENTS

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Illustrative Operating Environment

Figure 1:
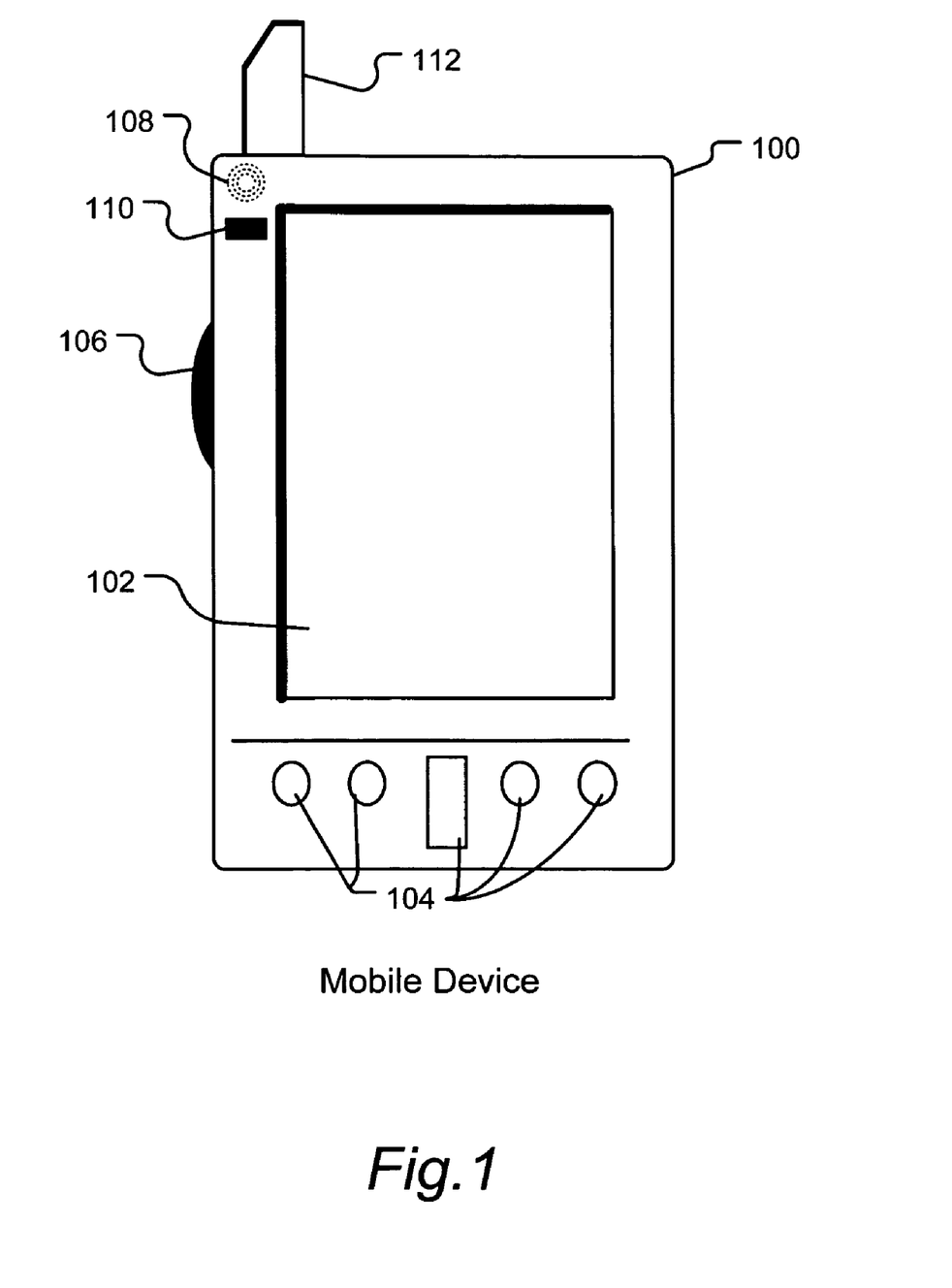
FIG. 1 is a diagram illustrating an exemplary mobile computing device that may be used according to an exemplary embodiment of the present invention.

FIG. 1 illustrates an embodiment of a mobile device 100 incorporating aspects of the present invention. In this embodiment, mobile device 100 is a handheld computer having both input elements and output elements. Input elements may include touch screen display 102 and input buttons or keypad 104 and allow the user to enter information into mobile computing device 100. Mobile device 100 also incorporates a side input element 106 allowing further user input. Side input element 106 may be a rotary switch, a button, or any other type of manual input element. In alternative embodiments, mobile device 100 may incorporate more or less input elements. For example, display 102 may not be a touch screen in some embodiments. In yet another alternative embodiment, mobile computing device 100 is a portable phone system, such as a cellular phone having display 102 and input buttons 104 or keypad 104.

Mobile device 100 incorporates output elements, such as display 102, which can display a graphical user interface (GUI). Other output elements include speaker 108 and LED light 110. Additionally, mobile device 100 may incorporate a vibration module (not shown), which causes mobile device 100 to vibrate to notify the user of an event. In yet another embodiment, mobile device 100 may incorporate a headphone jack (not shown) for providing another means of providing output signals.

Mobile device 100 also incorporates antenna 112 for communication between mobile device 100 and communication networks or other mobile devices. For example, antenna 112 may be employed for receiving a telephone call via a cellular network. While the telephone communication may be considered the main form of communication for mobile device 102, other, alternate communication methods are also available. For example, mobile device 102 may communicate directly with other mobile devices through the use of Short Messaging Service (SMS) communication. SMS corresponds to the transmission of short text messages to and from a mobile phone, fax machine and/or IP address. Once a message is sent, it is received by a Short Message Service Center (SMSC), which then transmits it to the appropriate mobile device.

In another example, mobile device 102 may communicate directly with another mobile device through the use of Internet Protocol (IP) communication when both mobile devices are IP enabled. A mobile device is IP enabled when the communication capabilities of the mobile device include Internet browsing functionality. IP communication refers general to communication protocols such as TCP/IP that allow connection and communication between hosts on the Internet. Both IP and SMS are considered "direct" connections between mobile devices despite the fact that the communication between devices may pass through any number of intermediary devices or be facilitated by a service. The connection is a direct connection because the data passed between devices is not stored on any intermediary device for any greater purpose than to pass the data to the destination device. In another type of communication, such as many types of server/client communications, the data communicated from the client is stored on the server and awaits a request by other device for download. This server/client communication is not considered direct communication between devices.

These types of communication are not the only types of communication available to mobile device 102. Additionally, any of these communication types may take place coincidentally with the telephone call or other types of communication of mobile device 100. Coincidental communication refers to communication that occurs concurrently or substantially concurrently with another communication of the mobile device. For example, a telephone call may be received by a mobile device, and then the other coincidental communication may be initiated in response. Some delay may correspond to the initiation of the coincidental communication. Furthermore, the coincidental communication may end before or after the telephone call while still being considered a coincidental communication.

Although described herein in combination with mobile computing device 100, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like.

Figure 2:
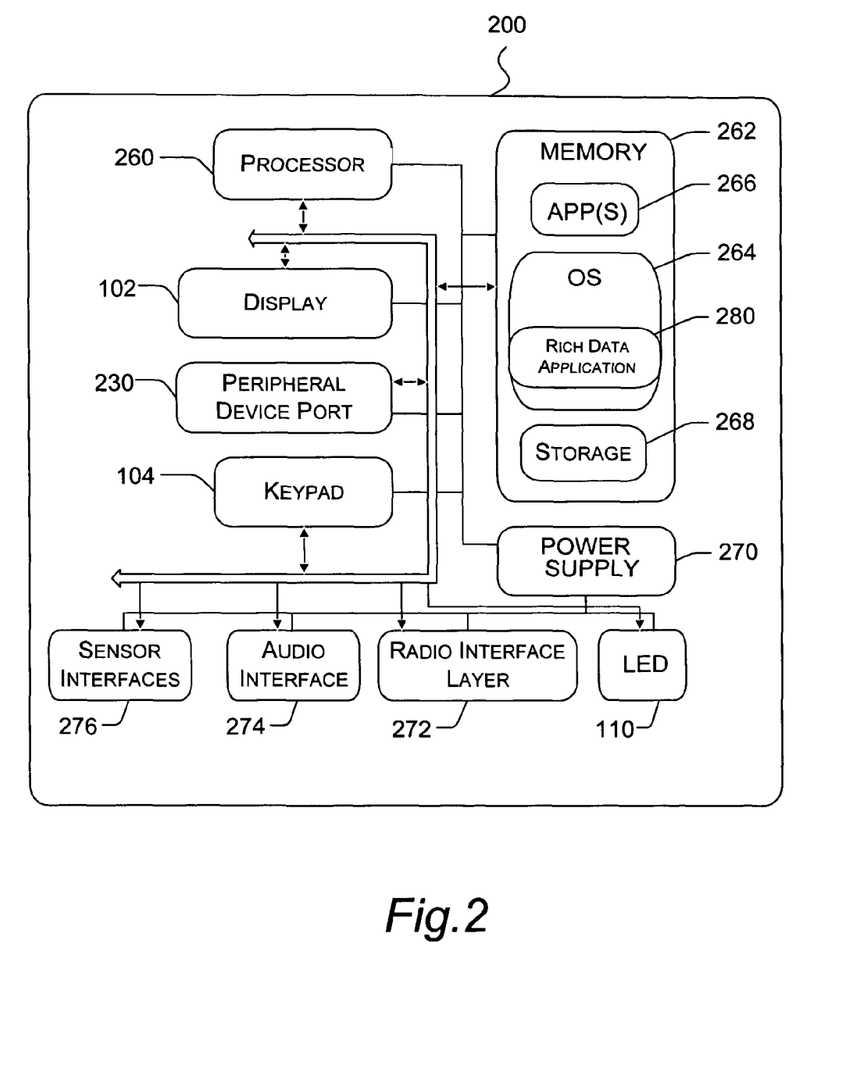
FIG. 2 is a block diagram illustrating components of a mobile computing device used in an embodiment of the present invention, such as the computer shown in FIG. 1.

FIG. 2 illustrates a system 200 used in an embodiment of the present invention, such as the mobile device shown in FIG. 1. That is, mobile computing device 100 (FIG. 1) can incorporate system 200 to implement an embodiment of the invention. For example, system 200 can be used in implementing a "smart phone" that can run one or more applications similar to those of a desktop or notebook computer such as, for example, browser, email, scheduling, instant messaging, and media player applications. System 200 can execute an OS such as, for example, Windows XP®, Windows Mobile 2003® or Windows CE® available from Microsoft Corporation, Redmond, Wash. In some embodiments, system 200 is integrated as a computing device, such as an integrated personal digital assistant (PDA) and wireless phone.

In this embodiment, system 200 has a processor 260, a memory 262, display 102, and keypad 104. Memory 262 generally includes both volatile memory (e.g., RAM) and non-volatile memory (e.g., ROM, Flash Memory, or the like). System 200 includes an OS 264, which in this embodiment is resident in a flash memory portion of memory 262 and executes on processor 260. Keypad 104 may be a push button numeric dialing pad (such as on a typical telephone), a multi-key keyboard (such as a conventional keyboard), or may not be included in the mobile computing device in deference to a touch screen or stylus. Display 102 may be a liquid crystal display, or any other type of display commonly used in mobile computing devices. Display 102 may be touch-sensitive, and would then also act as an input device.

One or more application programs 266 are loaded into memory 262 and run on operating system 264. Examples of application programs include phone dialer programs, e-mail programs, PIM (personal information management) programs, word processing programs, spreadsheet programs, Internet browser programs, and so forth. System 200 also includes non-volatile storage 268 within memory 262. Non-volatile storage 268 may be used to store persistent information that should not be lost if system 200 is powered down. Applications 266 may use and store information in non-volatile storage 268, such as e-mail or other messages used by an e-mail application, contact information used by a PIM, documents used by a word processing application, and the like. A synchronization application (not shown) also resides on system 200 and is programmed to interact with a corresponding synchronization application resident on a host computer to keep the information stored in non-volatile storage 268 synchronized with corresponding information stored at the host computer. In some embodiments, non-volatile storage 268 includes the aforementioned flash memory in which the OS (and possibly other software) is stored.

System 200 has a power supply 270, which may be implemented as one or more batteries. Power supply 270 might further include an external power source, such as an AC adapter or a powered docking cradle that supplements or recharges the batteries.

System 200 also includes a radio 272 that performs the function of transmitting and receiving radio frequency communications. Radio 272 facilitates wireless connectivity between system 200 and the "outside world", via a communications carrier or service provider. Transmissions to and from radio 272 are conducted under control of OS 264. In other words, communications received by radio 272 may be disseminated to application programs 266 via OS 264, and vice versa.

Radio 272 allows system 200 to communicate with other computing devices, such as over a network. Radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 200 is shown with two types of notification output devices: LED 110 that can be used to provide visual notifications and an audio interface 274 that can be used with speaker 108 (FIG. 1) to provide audio notifications. These devices may be directly coupled to power supply 270 so that when activated, they remain on for a duration dictated by the notification mechanism even though processor 260 and other components might shut down to conserve battery power. LED 110 may be programmed to remain on indefinitely until the user takes action to indicate the powered-on status of the device. Audio interface 274 is used to provide audible signals to and receive audible signals from the user. For example, in addition to being coupled to speaker 108, audio interface 274 may also be coupled to a microphone to receive audible input, such as to facilitate a telephone conversation. In accordance with embodiments of the present invention, the microphone may also serve as an audio sensor to facilitate control of notifications, as will be described below.

This embodiment of system 200 also includes sensor interfaces 276 used to receive signals from environment sensors (e.g., accelerometers, light sensors, pressure sensors, etc.). In accordance with embodiments of the invention, the sensor signals can be used in controlling or generating notifications, as described below.

In accordance with embodiments of the present invention, OS 264 includes a rich data communication component 280. In one aspect, rich data communication component 280 is used to provide the coincidental communication of rich contact information upon the commencement of a telephone call. In another embodiment, rich data communication component 280 is included in applications 266 as an application of system 200.

While the above figures and description describe particular embodiments of a mobile device, it is appreciated that the definition of mobile device as used throughout this description and the claims is not limited to this example. Instead, a mobile device is broadly defined as any device capable of sending and receiving a telephone call while sending or receiving alternate data, such as an Internet enabled telephone, a telephonic enabled computing device, a voice-over-IP enabled computing device, or the like.

Illustrative Embodiments for Communication of Rich Data Coincident to a Telephone Call When a user receives a phone call today, the phone network sometimes provides a caller ID; that is, the phone number of the party that's calling. Sometimes, the telephone network also sends a short name if it finds the short name in a directory managed by the network. This helps the receiver make a decision about whether to answer the call and if so, how to prepare for the call. Unfortunately, a caller ID system has a number of problems. Caller ID information is not always available. When the caller ID information is unavailable, the receiver usually sees "Unknown Caller" or something similar. Additionally, caller ID doesn't provide very rich information. In most cases, it's just the phone number. In some cases, it's just the number and a short name. Some mobile devices solve part of this problem by matching the number to a contact card that's stored on the phone. However, matching the number to a stored contact only works if the user has previously stored this information in a contact entry on the mobile device receiving the call.

Embodiments of the present invention solve these shortcomings by allowing the user to send rich personal contact information over a coincidental data channel at the start of the phone call. The system provides arbitrary, rich information (e.g. a personal web page, all contact phone/fax numbers, all email addresses, a picture, a video, etc.). The rich information may then be automatically displayed to the user on the other end when receiving the telephone call. In addition, the user may then save this information to their mobile device for future reference.

Figure 3:
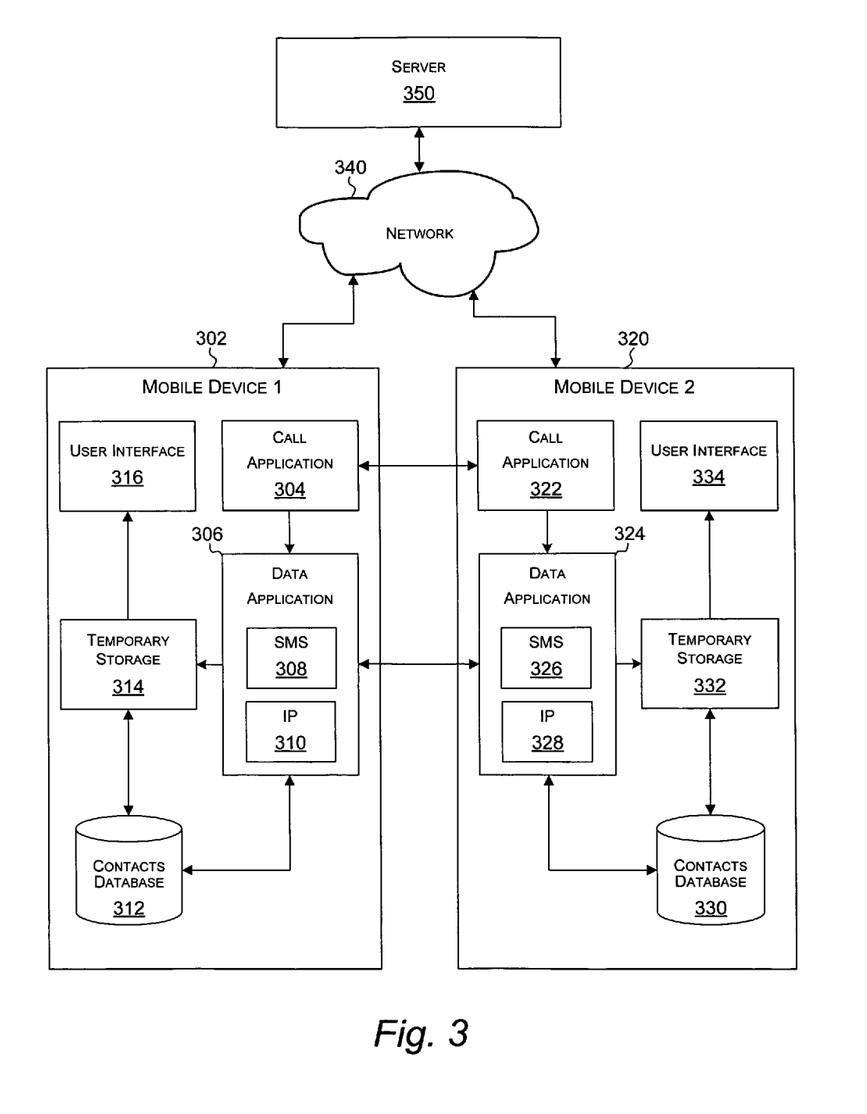
FIG. 3 is a block diagram illustrating communication of rich data between two mobile devices according to an embodiment of the present invention.

FIG. 3 is a block diagram illustrating communication of rich data between two mobile devices according to an embodiment of the present invention. Each mobile device (302, 320) includes a call application (304, 322), a data application (306, 324), a contacts database (312, 330), a temporary storage (314, 322), and a user interface (316, 322). The data applications (306, 324) of each mobile device (302, 320) include an SMS module (308, 326) and IP module (310, 328) that ate used to communicate between mobile devices using SMS and Internet protocols. Additionally, while in communication or separately, each mobile device (302, 320) may be connected to server 350 via network 340.

A telephone call may be initiated between the mobile devices using call applications 304 and 322. In response to the initiation of the phone call, data applications 306 and 324 receive a notification about or alternatively monitor the state of the call. When the call application of the receiving mobile device notifies the data application of an incoming call, the data application uses either its corresponding SMS component or IP component to request the rich content data from the sending mobile device.

When the rich contact data is received from the sending mobile device, it is temporarily stored in temporary storage (314, 332). From temporary storage, the rich contact data may be forwarded to contacts database (312, 330) for long-term storage on the mobile device and/or to the user interface (316, 334) for display to the user.

In addition to the communication between mobile devices, it may be that server 350 includes a table or other database that relates phone numbers with IP addresses for mobile devices across the network. When a call is received at a mobile device, the mobile device is able to determine the IP address of sending mobile device from this database. A communication connection between devices may then be established using the discovered IP address. A more detailed description of the coincidental communication between mobile devices is included in the discussion of FIGS. 4-6 below.

Figure 4:
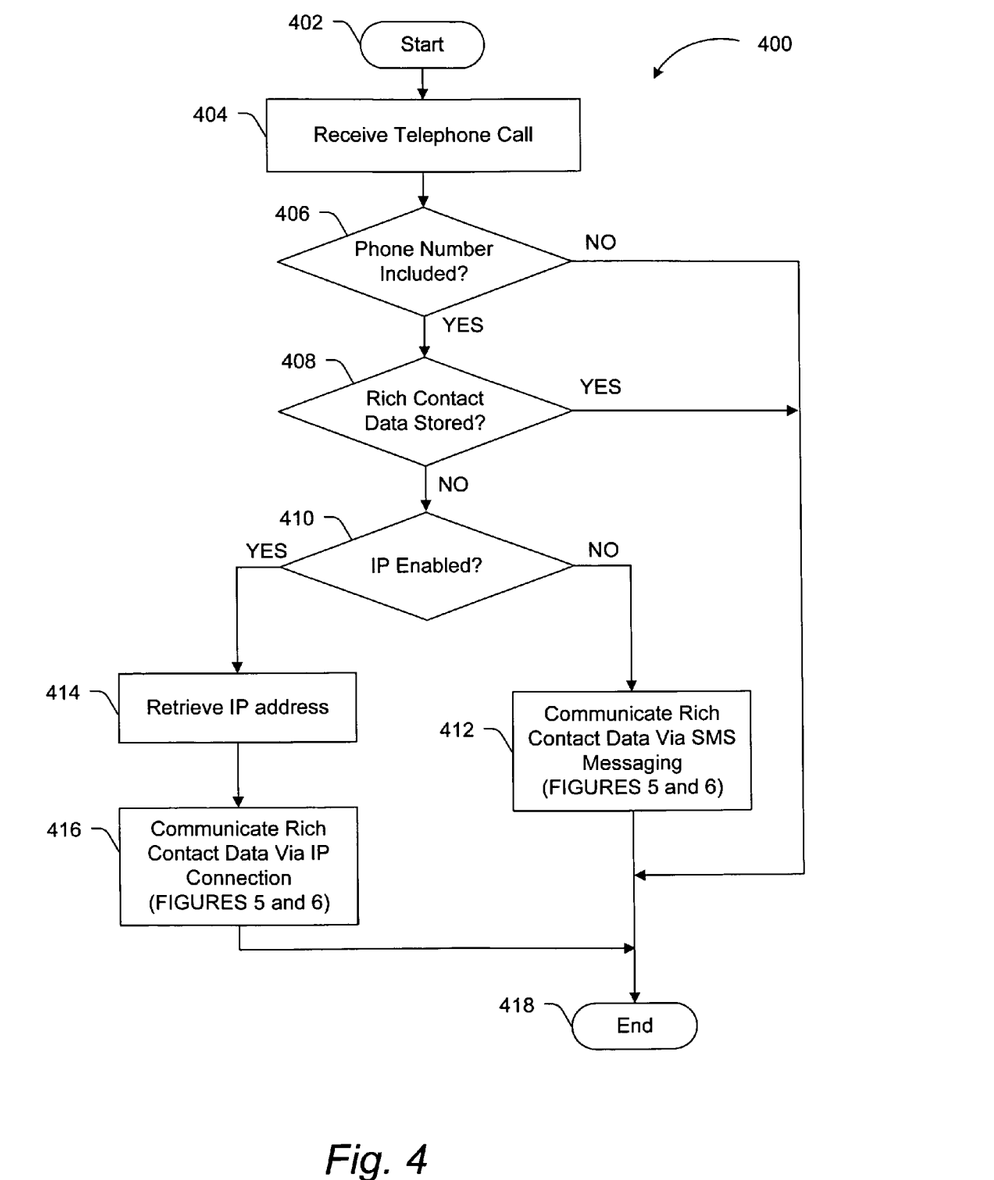
FIG. 4 is a logical flow diagram illustrating an exemplary process for coincidental communication of rich contact data according to one embodiment of the present invention.

FIG. 4 is a logical flow diagram illustrating an exemplary process for coincidental communication of rich contact data according to one embodiment of the present invention. Process 400 begins at start block 402 where two mobile devices are present and active on a mobile telephone network. Processing continues at block 404.

At block 404, a receiving mobile device receives a telephone call originating from a sending mobile device. The telephone call may include information such as a caller ID that includes the telephone number of the sending mobile device and possibly a short name associated with the number. Once the call is received, processing continues at decision block 406.

At decision block 406, a determination is made whether a phone number of the sending mobile device is included with the incoming call. Certain callers may select to have their caller ID information blocked from being displayed on a receiving mobile device. When the caller ID information is blocked, no phone number for the sending mobile device is received. If no caller ID information is included with the incoming call, then processing advances to block 418 where processing with relation to call ends. However, if caller ID information is included with the call, processing continues to decision block 408.

At decision block 408, a determination is made whether the rich contact data corresponding to the phone number of the sending mobile device is already stored on the receiving mobile device. It may be that the receiving mobile device has received a call from the sending mobile device previously. If so, the receiving mobile device may already have the rich contact data from the sending mobile device stored. By determining whether the rich contact data for the phone number of the incoming call is already stored, unnecessary processing of between the mobile devices may be avoided. Avoiding processing the request for rich contact data avoids taking up processing time of the mobile devices. The cost of the additional communication is also avoided as some communication types may have an associated cost to the user. As an optimization of the present invention, a determination may also be made whether the rich contact data, if already stored, has been stored for some extended period of time. Being stored for an extended period may indicate that the rich contact data is out of date, and should be updated according the process provided by the present invention. Additionally, the stored rich contact data may have a property associated with it that request the data to be updated each time the sending mobile device calls the receiving mobile device. For example, the user of the sending mobile device may have selected to send a short video clip that the user updates regularly to receivers of calls from the user's mobile device. In the example shown, if rich contact data is already stored on the receiving mobile device, the rich contact data does not need to be communicated, and processing advances to block 418 where processing with relation to the call ends. However, if no rich contact data associated with the phone number of the incoming call is stored on the receiving mobile device, processing continues at decision block 410.

At decision block 410, a determination is made whether the receiving and sending mobile devices are IP enabled. In one embodiment, an indication that the sending mobile device is IP enabled is included with the telephone call sent to the receiving mobile device. A property may be included with the caller ID information or a simultaneous SMS message or other communication may be sent alongside the telephone call to the receiving mobile device. In another embodiment, the receiving mobile device and the sending mobile device enter a handshake process where the determination of network capability is communicated between devices. If the mobile devices are not IP enabled, processing continues to block 412 where the communication of the rich contact information is handled through SMS messaging or a similar protocol (see FIGS. 5 and 6 below). However, if the mobile devices are IP enabled, processing continues at block 414.

At block 414, the IP address for the sending mobile device is retrieved by the receiving mobile device. In one embodiment, the IP address is requested directly from the sending mobile device through the use of another communication protocol (e.g., SMS). In another embodiment, the receiving mobile device uses its own Internet connection to access a database on a remote server (e.g., server 350 of FIG. 3). The server contains a lookup table that cross-references IP addresses and telephone numbers. The receiving mobile device uses the phone number received from the sending mobile device to determine the sending mobile device's IP address. Once the IP address for the sending mobile device is obtained, processing continues at block 416.

At block 416, the rich contact data is communicated from the sending mobile device to the receiving mobile device. In one embodiment, the rich contact data is communicated according to process steps similar to those described in FIGS. 5 and 6 below. In another embodiment, the sending mobile device and the receiving mobile device actually exchange rich contact information between each other. The rich contact information can be any format, from v-cards to video, but the data substantially adds to the information provided by caller ID. After the data is communicated, processing continues to block 418, where process 400 ends.

Figure 5:
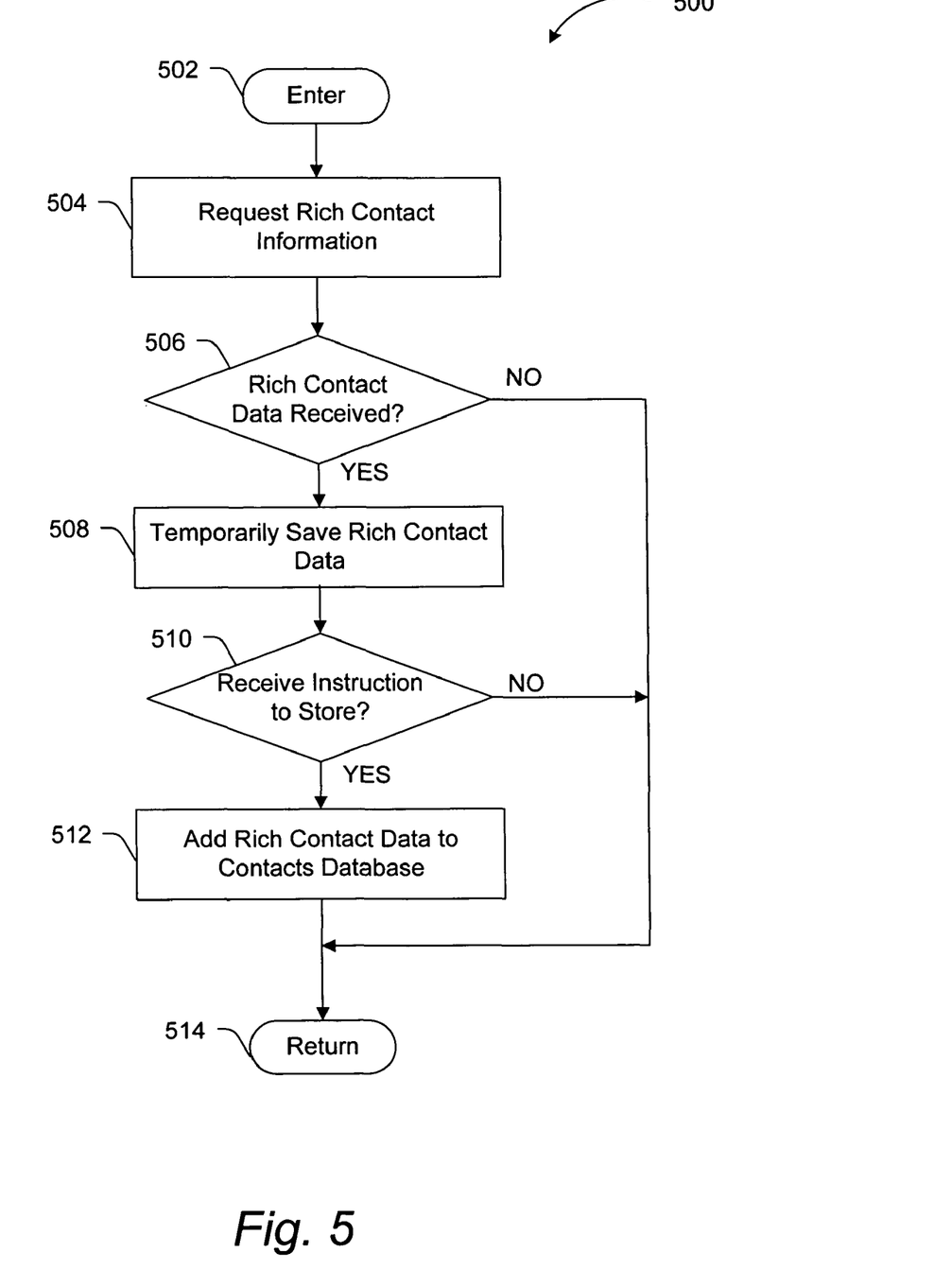
FIGS. 5 and 6 are logical flow diagrams illustrating exemplary, complimentary processes for coincidental communication of rich contact data according to one embodiment of the present invention.
Figure 6:
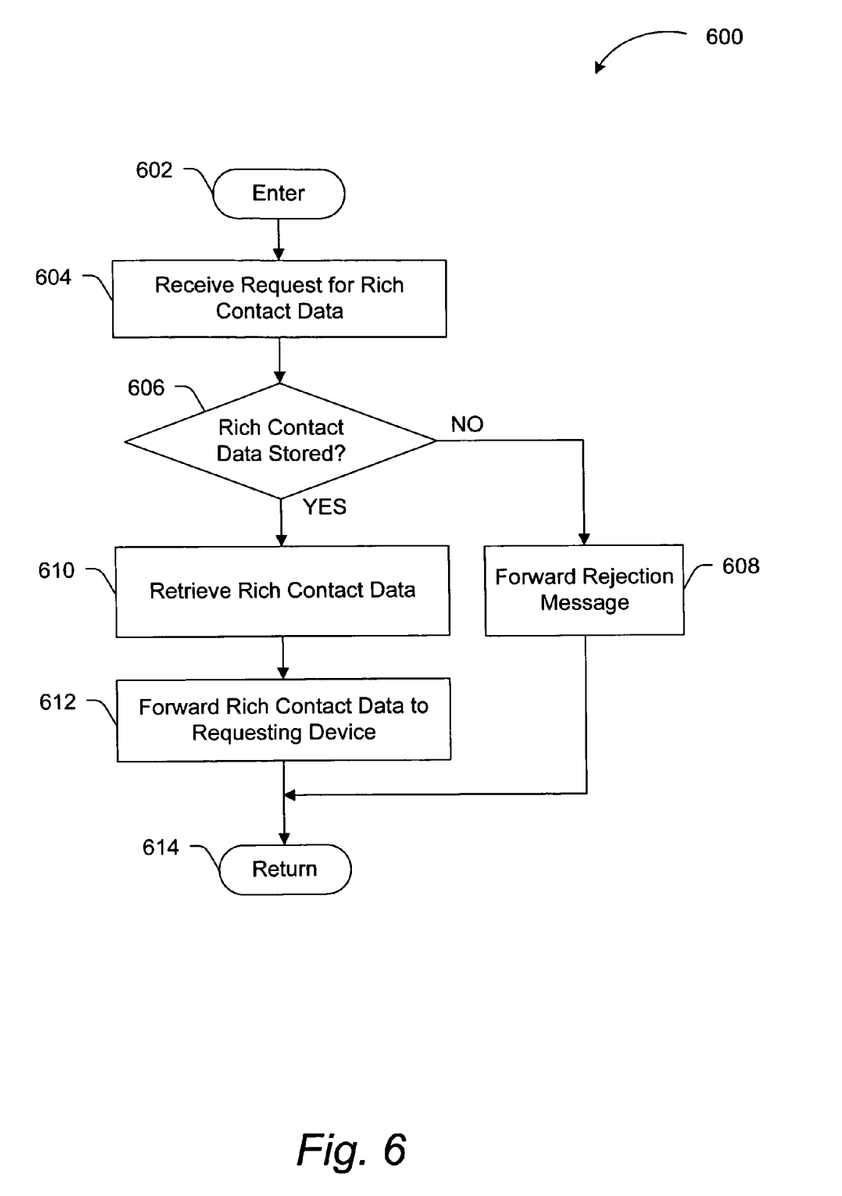

FIGS. 5 and 6 are logical flow diagrams illustrating exemplary, complimentary processes for coincidental communication of rich contact data according to one embodiment of the present invention. Processes 500 and 600 are occurring concurrently with one another, where certain steps of process 500 are dependent on the execution of steps in process 600, and certain steps of process 600 are dependent upon the execution of steps in process 500. Processes 500 and 600 operate concurrently to automatically send rich contact data coincident to phone call without the need for user to affirmatively request such information. For FIG. 5, process 500 enters at block 502 where process 400 enters block 412 or block 416 depending on the communication protocol selected for transmitting the rich contact data. Processing continues at block 504.

At block 504, the receiving mobile device sends a request for the rich contact information to the sending mobile device across the coincidental communication connection. If the alternate communication connection coincidental to the telephone call corresponds to SMS, then the request for the rich contact data is sent using an SMS message. If the alternate communication corresponds to IP communication, then the message may be sent using TCP/IP packets. Once the request for the rich contact data is sent, processing continues at decision block 506.

At decision block 506, a determination is made whether the rich contact data is returned to the receiving mobile device in response to the request. It may be that the other mobile device does not have rich contact data to send, or the user of the sending mobile device has selectively turned off this functionality. It may even be that the sending mobile device is not capable of responding to such requests. In these circumstances, the receiving mobile device may receive nothing back in response to its request, or possible an error message. If the receiving mobile device does not receive back the rich contact data, then processing advances to block 514 where process 400 returns to block 418 of FIG. 4. However, if the rich contact data is returned to the receiving mobile device, then processing continues at block 508.

At block 508, the rich contact data is stored temporarily in a temporary storage location (e.g., temporary storage 314 or 332 of FIG. 3). Temporarily storing the rich contact data allows data to be displayed to the user during the telephone call. In one embodiment, the presentation of the rich contact data depends on the format of data and the current state of the telephone call. For example, the telephone call may be an incoming call on the mobile device that has not been answered yet by the user. The mobile device may present the rich contact data in first presentation format that relates enough information for the user of the receiving mobile device to make an informed decision of whether to answer the call. In another example, the call may be finished and the rich contact data is presented in a second format that allows the user to decide whether to store the contact data to their mobile device for future use. In still another embodiment, the data corresponds to a third format such as a picture or an animation that is meant to be displayed while the call is in progress. Once the rich contact data is temporarily stored, processing continues at decision block 510.

At decision block 510, a determination is made whether the receiving mobile device has received instructions to store the rich contact data in the contacts database (e.g., 312 or 330 of FIG. 3). In one embodiment, the rich contact data is displayed to a user at the end of the telephone call along with a dialogue asking the user whether they desire to store the data. In another embodiment, a property on the receiving mobile device may be set to automatically store the data when received. In still another embodiment, the property may be qualified so that only contact data corresponding to numbers of a specific area code are automatically stored. In still another embodiment, the rich contact data may be configured by the sending mobile device such that the actions the receiving mobile device may take with regard to the data is limited (i.e., digital rights management). If the receiving mobile device does not receive instructions from the user to store the rich contact data or is configured to store the data automatically, processing continues to block 514 where processing returns to block 418 of FIG. 4. However, if the receiving mobile device does receive instructions from the user to store the rich contact data or is configured to store the data automatically, processing continues at block 512.

At block 512, the rich contact data is transferred from the temporary storage to the contacts database of the receiving mobile device. The rich contact data is then accessible to the user of the receiving mobile device upon request at a later time. The rich contact data may be update by additional coincidental communication between mobile devices in the future. Once the rich contact data is stored, processing continues to block 514, where processing returns to block 418 of FIG. 4.

For FIG. 6, process 600 enters block 602 when the request is sent by the receiving mobile device at block 504 of FIG. 5. Processing continues at block 604.

At block 604, the request for the rich contact data is received by the mobile device originating the telephone call. In one embodiment, the sending mobile device is configure to monitor both incoming SMS messages and IP communications to determine whether information sent to the mobile device corresponds to a request for rich contact data. When this type of request is recognized, processing continues at decision block 606.

At decision block 606, a determination is made whether the sending mobile device has rich contact data stored that may be sent to the receiving mobile device. In one embodiment, the user has previously stored rich contact data and selected it to be forwarded to other mobile devices coincident to outgoing or incoming telephone calls. For example, the user of a mobile device may have their own v-card stored on their mobile device. The mobile device then awaits requests for rich contact data for forwarding this v-card to other mobile devices. In another embodiment, the user may select a property associated with their own rich contact data that prevents the rich contact data from being sent to every requesting mobile device. For example, a user may set the property so that the v-card is only sent to requesting mobile devices that have a number already included in the user's contact database. Other optimizations are also available for selecting which requesting mobile devices will receive the user's rich contact data. Additionally, the user may have more than one set of rich contact data, such as a v-card for friends that lists personal number and the like, along with a business v-card that lists business numbers. The user may further select which requesting mobile device receive a certain set of rich contact data. In the current example, if the user does not have rich contact data stored, processing continues to block 608.

At block 608, an error or rejection message is sent to the requesting mobile device stating that the request for the rich contact data is denied. This rejection message may also be used when the user does have their rich contact data stored but does not wish it to be shared with this particular user. In another embodiment, the request may simply be ignored rather than using the rejection message. The rejection message may be sent using SMS or IP depending on the communication method of the request. Processing then advances to block 614 where process 600 returns to decision block 506 of FIG. 5.

If instead, the user does have rich contact data stored for forwarding to mobile devices, processing continues at block 610. At block 610, the sending mobile device retrieves the rich contact data from where it is stored and translates the data to a format correspond to the communication type of the request. For example, if the request for the rich contact data came in the form of an SMS message, then the rich contact data is converted to one or more SMS messages for return back to the requesting mobile device. Once the rich contact data is retrieved, processing continues at block 612.

At block 612, the rich contact data is forwarded to the requesting (i.e., receiving) mobile device. The rich contact data is forwarded according to the format of the request from the requesting mobile device on a communication connection that is coincidental to the telephone call. In one embodiment the rich contact data is forwarded using one or more SMS messages. In another embodiment, the rich contact data is forward as one or more IP packets across an Internet connection. One the rich contact data is forwarded to the receiving mobile device, processing continues to block 614 where processing returns to block 506 of FIG. 5.

In an alternative embodiment, instead of the sending mobile device simply forwarding its associated rich contact data to the receiving mobile device, the mobile devices actually exchange contact data. Processes 500 and 600 are then applicable to both mobile devices, and the rich contact data may be made available to both users.

In another embodiment, processes 500 and 600 may be modified to a "push" model of operation rather than the "pull" model described. The processes of 500 and 600 are described as a "pull" model of operation because the communication of the rich contact data is predicated on a request from the mobile device receiving the incoming telephone call. Accordingly, the rich contact data is not forwarded unless such a request is made. In an alternative "push" model, the mobile device initiating the telephone call already knows the phone number of the receiving mobile device as required for initiating the call. The sending mobile device is therefore able to also initiate the coincidental, alternate communication that allows for the transfer of the rich contact data. The sending mobile device may send its own SMS message or IP communication with rich contact data and leave it to the receiving mobile to decide whether to process the communication. The sending mobile device therefore "pushes" the data to other mobile devices in advance to any requests.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A method for automatically transmitting rich content between mobile devices coincident to a telephone call, the method comprising:
   receiving an incoming telephone call from the first mobile device at the second mobile device;
   in response to receiving the incoming telephone call, the second mobile device requesting from the first mobile device rich content that is associated with the first mobile device;
   before the incoming telephone call is answered and in response to receiving the incoming telephone call, establishing an alternate communication connection between the first mobile device and the second mobile device, wherein the alternate communication connection is a direct connection between devices resolved from a telephone number provided in the telephone call; and
   transmitting the rich content associated with the first mobile device from the first mobile device to the second mobile device across the alternate communication connection before the incoming telephone call is answered.

2. The method of claim 1, wherein the alternate communication connection corresponds to at least one of sending and receiving an SMS message.

3. The method of claim 1, wherein the alternate communication connection corresponds to at least one of sending and receiving an IP communication.

4. The method of claim 1, further comprising displaying the rich content on the second mobile device while the telephone call is still in progress.

5. The method of claim 1, further comprising transmitting additional rich content from the second mobile device to the first mobile device across the alternate communication connection.

6. The method of claim 1, wherein the rich content is stored on the second mobile device for future reference.

7. The method of claim 6, wherein the rich content is stored in response to input directing the second mobile device to store the rich content.

8. The method of claim 1, wherein the rich content is transmitted from the first mobile device to the second mobile device in response to a request from the second mobile device for the rich content.

9. The method of claim 1, wherein the rich content is transmitted from the first mobile device to the second mobile device automatically when the first mobile device initiates the telephone call.

10. The method of claim 1, wherein the telephone number corresponds to a telephone number associated with the second mobile device that is used to initiate the telephone call on the first mobile device.

11. The method of claim 1, wherein the telephone number corresponds to a telephone number associated with the first mobile device that is received within caller ID information on the second mobile device.

12. The method of claim 1, wherein an IP address of at least one of the mobile devices is determined for establishing the alternate communication connection by examining a lookup table the cross-references IP addresses with telephone numbers.

13. The method of claim 12, wherein the lookup table is located on a remote server.

14. The method of claim 1, further comprising determining whether the rich content is already stored on the second mobile device prior transmitting the rich content from the first mobile device to the second mobile device.

15. The method of claim 1, further comprising determining whether the first and second mobile devices are IP enabled, wherein the alternate communication connection corresponds to at least one of sending and receiving an IP communication when the mobile devices are IP enabled and the alternate communication connection corresponds to at least one of sending and receiving an SMS message when the mobile devices are not IP enabled.

16. The method of claim 1, wherein the rich content correspond to contact data associated with the user of the first mobile device.

17. A memory having stored thereon instructions that when executed on the first and second mobile devices implements the method of claim 1.

18. A mobile device arranged to at least one of send and receive rich content coincident to a telephone call, the system comprising:
   a call application that is configured to at least one of initiate and receive a telephone call; and
   a data application that is configured to at least one of send and receive the rich content across an alternate communication connection, wherein the alternate communication connection is a direct connection from the mobile device to another mobile device that is established by referencing a telephone number associated with the telephone call; and when the call application on the mobile device initiates the telephone call the data application sends from the mobile device the rich content in response to a request from the another mobile device receiving the telephone call such that it is received by the another mobile device before the telephone call is answered.

19. A method for automatically transmitting rich content between mobile devices coincident to a telephone call, the system comprising:
   means for receiving a telephone call at a second device from a first device;
   in response to receiving the incoming telephone call, means for requesting from the first device rich content that is associated with the first device;
   means for establishing an alternate communication connection between the first device and the second device, wherein the alternate communication connection is a direct connection between the first and second devices resolved from a telephone number provided in the telephone call; and
   means for receiving the rich content associated with the first device from the first mobile device that is transmitted across the alternate communication connection before the telephone call is answered.

20. A memory having stored thereon instructions that when executed implements the method of claim 19.

* * * * *